United States Patent
Musgrove et al.

(10) Patent No.: US 11,658,712 B1
(45) Date of Patent: May 23, 2023

(54) COMPUTER IMPLEMENTED METHOD FOR REDUCING ADAPTIVE BEAMFORMING COMPUTATION USING A KALMAN FILTER

(71) Applicants: Cameron Musgrove, Bixby, OK (US); Jason Keen, Huntsville, AL (US)

(72) Inventors: Cameron Musgrove, Bixby, OK (US); Jason Keen, Huntsville, AL (US)

(73) Assignee: IERUS Technologies, Inc., Huntsville, AL (US)

(*) Notice: Subject to any disclaimer, the term of this patent is extended or adjusted under 35 U.S.C. 154(b) by 0 days.

(21) Appl. No.: 17/709,457

(22) Filed: Mar. 31, 2022

(51) Int. Cl.
*H04L 1/02* (2006.01)
*H04B 7/0456* (2017.01)
*H04B 7/0452* (2017.01)
*H01Q 3/26* (2006.01)

(52) U.S. Cl.
CPC ......... *H04B 7/0456* (2013.01); *H01Q 3/2682* (2013.01); *H04B 7/0452* (2013.01)

(58) Field of Classification Search
CPC .. H04B 7/0408; H04B 7/0413; H04B 7/0417; H04B 7/0443; H04L 27/26; H04L 27/2602; H04L 5/0007; H04L 5/005; H04W 72/00; H04W 16/14; H04W 72/04; H04W 72/085; H04W 40/04
USPC ....................................... 375/267, 260, 262
See application file for complete search history.

(56) References Cited

U.S. PATENT DOCUMENTS

| | | | |
|---|---|---|---|
| 7,046,188 | B2 | 5/2006 | Zaugg et al. |
| 7,227,111 | B2 | 6/2007 | Eckelkamp-Baker et al. |
| 8,134,499 | B2 | 3/2012 | Wang et al. |
| 9,832,602 | B2 | 11/2017 | Moshfeghi |

(Continued)

FOREIGN PATENT DOCUMENTS

| | | |
|---|---|---|
| CN | 110596696 A | 12/2019 |
| KR | 10-1649198 | 8/2016 |

(Continued)

OTHER PUBLICATIONS

"Further Study on Robust Adaptive Beamforming With Optimum Diagonal Loading", Author: Ayman Elnashar, Said M. Elnoubi, and Hamdi A. El-Mikati, Senior Member, IEEE—vol. 54, No. 12, Dec. 2006 (Year: 2006).*

(Continued)

*Primary Examiner* — Khai Tran
(74) *Attorney, Agent, or Firm* — Lanier Ford Shaver & Payne, PC; Gerald M. Walsh (57) ABSTRACT

A method for reducing adaptive beam forming computation resources for estimating and updating a model of unwrapped beam weights. The optimal beam pattern weights of an antenna array are estimated using an adaptive beamforming algorithm. An initial model is created for either magnitude or phase components of the optimal beam pattern weights computed from the adaptive beamforming algorithm estimates. For each time step, a measurement of optimal beam pattern weights is estimated, using a reduced set of data comprising 5-20% of first samples of signal reference data. New beam pattern weights are computed using a magnitude (Continued)

Kalman filter (KF) and/or phase KF, wherein the computation resources required to obtain the new beam pattern weights are reduced by 80 to 90% over an adaptive beam forming algorithm.

8 Claims, 6 Drawing Sheets

(56) References Cited

U.S. PATENT DOCUMENTS

2003/0201936 A1\* 10/2003 Kim .................. H04B 7/0408
                                                          342/372
2022/0182105 A1\* 6/2022 Ota ..................... H04B 7/01

FOREIGN PATENT DOCUMENTS

| KR | 10-1869224     | 6/2018  |
|----|----------------|---------|
| KR | 10-2021-0044645 | 4/2021  |
| KR | 10-2021-0115526 | 9/2021  |
| KR | 10-2021-0128841 | 10/2021 |

OTHER PUBLICATIONS

"Adaptive Beam forming based on the Kalman Filter", Author: Zinal Patel; Conference Paper, Nov. 2014, 17 pages.

\* cited by examiner

COMPUTER IMPLEMENTED METHOD FOR REDUCING ADAPTIVE BEAMFORMING COMPUTATION USING A KALMAN FILTER

FIELD OF THE INVENTION

This invention relates generally to a method for reducing the amount of computation required for adaptive beam forming and, more particularly, to using a Kalman filter algorithm to estimate and update a linear model of unwrapped beam weights, thereby reducing adaptive beamforming computation.

BACKGROUND OF THE INVENTION

The term beamforming refers to a method of directing a wireless signal towards a specific receiving device, whereas the alternative would be allowing the signal to spread in all directions from a transmitter the way it naturally would. By focusing a signal in a specific direction, beamforming delivers higher signal quality to a receiver so that information is transmitted faster and more accurately.

An antenna array is comprised of multiple radiating elements, each of which contributes an element pattern to the array's radiation pattern. Each element pattern is a spatial distribution of RF power arising from the amplitude and phase of the RF signal at the element's RF feed point. The array's radiation pattern is determined by the coherent sum of all element fields, each which may be "weighted" by an additional amplitude and phase. Such weighted patterns exemplify beamforming in the array, whereby sidelobe levels and nulls are produced and controlled by adjusting the element weights. Adaptive beamforming computes the complex weights using an adaptive algorithm, which then generates an array factor for an optimal signal-to-interference-plus-noise ratio. Adaptive beamforming algorithms include Least Mean Square (LMS), Recursive Least Square (RLS), Sample Matrix Inversion (SMI), Conjugate Gradient (CG), Constant Modulus (CM), covariance matrix adaptation (CMA), and a beam forming algorithm based on the Weiner Filter.

In the 5G standard, the multiple user, multiple input multiple output (MU-MIMO) mode enables a base station gNodeB (gNB) to communicate with a specific user equipment (UE) by steering an antenna beam at that UE while specifically steering antenna beam nulls at other UEs. This approach allows the same time and frequency resources to be shared by multiple UEs that are spatially separated. 5G MU-MIMO applications do not assume the antenna array beam has a peak response because urban-like areas with multipath have a variable number of paths and gains for each path such that the optimal beam pattern may be a combination of several paths from different angles.

The beam pattern required for MU-MIMO is not a simple calculation. It requires matrix inversions and multiplications with optimization and numerical computation methods to calculate. There are many methods by which to calculate 5G MU-MIMO beam patterns. The optimal filter is a Wiener filter that estimates antenna array beam pattern weight values such that the received signal response matches a desired signal. The received signal, s, contains a desired signal, d, a combination of undesired signals, u, and noise, $\sigma$. Each antenna array element, $n \in 1 \ldots N$, where N is the number of antenna array elements, receives a different signal, $s_n$. The Wiener filter estimates a filter weighting, x, to minimize the error between the desired signal and the filtered combination of signals from each array element $(d-x^H s)^2$ (Saunders and Aragon-Zavala, Antennas and Propagation for Wireless Communications Systems, 2007, pages 443-445; https://www.academia.edu/12385294/Antennas_and_Propagation_for_Wireless_Communication _ Systems).

The Wiener filter isn't realizable because an auto-correlation matrix is not precisely known. Because the auto-correlation matrix is estimated from a finite number of discrete samples, the auto-correlation matrix is only an estimate of the true value. There are many methods to estimate the auto-correlation matrix that depend upon the application. The main differentiator among the many methods is whether the desired signal is known, or the beam is desired to be steered in a particular direction.

Since it may be assumed that reference signals are available in 5G, it may be further assumed that the desired signal is known and adaptive beamforming methods that include least mean square (LMS) and recursive least-squares (RLS) methods apply. Another class of adaptive beamforming algorithms, such as minimum variance distortionless response (MVDR), rely upon defining a desired steering vector for the array and the assumption is made that a main beam is steered in a particular direction.

Adaptive beam forming algorithms require a large number of computing operations per iteration and a large number of iterations are needed for convergence of iterative algorithms. The result requires the use of large computation resources. It is desirable to reduce the computation resources needed for adaptive beam forming algorithms so that overall power consumption and costs are reduced and computation resources are available for other tasks.

SUMMARY OF THE INVENTION

This invention is a computer implemented method for reducing adaptive beam forming computation resources for estimating and updating a model of beam weights. The optimal beam pattern weights of an antenna electromagnetic element signal duration are estimated using an adaptive beamforming algorithm for at least 3 time steps, typically by a computer system in a base station. An initial linear model is created for either magnitude or phase components of the optimal beam pattern weights computed from the adaptive beamforming algorithm estimates. For each time step, a measurement of the optimal beam pattern weights is estimated, using a reduced set of data comprising 5-20% of first samples of data generated by the electromagnetic signal duration. New beam pattern weights are computed using a magnitude state estimation filter and/or phase state estimation filter, wherein the computation resources required by the adaptive beam forming algorithm to obtain the new beam pattern weights are reduced by 80 to 90%.

For each antenna electromagnetic element signal duration, time step, and magnitude or phase state estimation filter: an estimator matrix is formed; the state of the beam weight model coefficients is predicted; error covariance is calculated; state estimation filter gain is calculated; beam weight model coefficients are estimated; new beam pattern weight is calculated using the estimate for the beam weight model coefficients; and error covariance is computed.

A preferred method for reducing adaptive beam forming computation resources is for estimating and updating a linear model of unwrapped beam weights. The optimal beam pattern weights of an antenna element signal are estimated, using an adaptive beamforming algorithm for at least 3 time steps. An initial linear model is created for either magnitude or phase components of the optimal beam pattern weights computed from the adaptive beamforming algorithm estimates. For each time step, a measurement of the optimal beam pattern weights is estimated, using a reduced set of data comprising 5-20% of first samples of data generated by the adaptive beamforming algorithm. KF state filter measurements are computed, wherein the computation resources required by the adaptive beam forming algorithm to obtain the new beam pattern weights are reduced by 80 to 90%.

For each antenna element signal and each time step, a linear estimator matrix is formed; the state of beam weight linear model coefficients is predicted; error covariance is calculated; Kalman gain is calculated; beam weight linear model coefficients are estimated; new beam pattern weight is calculated using the estimate for the beam weight linear model coefficients ; and error covariance is computed.

An advantage of the present invention is a KF algorithm that will reduce the computation resource requirement for obtaining beam pattern weights over an adaptive beam forming algorithm by 80 to 90 percent.

Another advantage is the ability to use only 5-20% of first samples of data for obtaining beam pattern weights.

Another advantage is a state estimation filter algorithm that can be used with any adaptive beam forming algorithm to reduce computation resource requirements of the adaptive beam forming algorithm.

Another advantage is a KF can be used as the state estimation filter.

DETAILED DESCRIPTION OF THE INVENTION

While the following description details the preferred embodiments of the present invention, it is to be understood that the invention is not limited in its application to the details of arrangement of the parts as described and shown in the figures disclosed herein, since the invention is capable of other embodiments and of being practiced in various ways.

Once a beam pattern is computed, it cannot be directly used for MU-MIMO. MU-MIMO uses the spatial separation of multiple UEs to let them share the same time and frequency resources for increasing the number of uses and throughput. This sharing is possible when the UEs are separated enough that a beam pattern for one UE can have a null for another UE within its pattern. The UE signals are separated at gNB by digitally applying a different set of element beam weights (for each UE) to the received signal. The method of this invention assumes those processes are separately calculated once each UE's beam is optimized or can be integrated into a track filtering processing to replace a LS method.

It is likely channel state information (CSI) (Nadeem, Q., Kammoun, A., and Alouini, M, "Elevation Beamforming With Full Dimension MIMO Architectures in 5G Systems: A Tutorial," IEEE Communications Surveys & Tutorials, Vol. 21, No. 4, 2019; https://ieeexplore.ieee.org/document/8770245.), UE-specific reference signals, and/or cell-specific reference signals (CRS) are the best candidates for adaptive beamforming. Within the 3GPP standards there are several different reference signals. All reference signals have a method by which to calculate a value to initialize a pseudo-random sequence generator (Evolved Universal Terrestrial Radio Access (E-UTRA); Physical channels and modulation, V16.7.0, 3GPP Standard TS 36.211, 2021, pages 15-24, 55-81, 147-180). That information is known to the receiver such that the receiver can apply the same calculations to reconstruct the bit sequence, yielding an exact copy of the desired signal.

In a preferred embodiment the present invention uses a Kalman filter (KF) type of state estimation filter to estimate and update a linear model of unwrapped beam weights. The linear model estimates the unwrapped phase or magnitude of the beam weights. The phase values of the unwrapped beam weights can be discontinuous in value as the phase changes between values that are within −pi and +pi. Phase unwrapping is a process by which the phase can appear as a continuous linear function. As a continuous linear function, a linear model can be applied to estimate the values of the continuous linear function.

An assumption is made that an adaptive beamforming process initially creates an estimate of the beam pattern weights. In one case, this is a least-squares (LS) estimate. From an initial set of at least 3 time samples, a linear model is created to estimate a model of the unwrapped phase of the beam weights. x is the initial set of beam weights calculated by an adaptive beamforming algorithm (such as, for example, LMS or RLS). Then a linear model is created for each antenna element to estimate the next beam weight phase value based on the previous beam weight value $$Z = H\ h \quad (1)$$

where $$H = \begin{bmatrix} x_n(t-2), 1 \\ x_n(t-1), 1 \end{bmatrix} \quad (2)$$

$$Z = \begin{bmatrix} x_n(t-1) \\ x_n(t) \end{bmatrix} \quad (3)$$

$$h = (H'*H)^{-1}H'*Z = \begin{bmatrix} h_1(t) \\ h_2(t) \end{bmatrix} \quad (4)$$

and the linear model describing the next beam weight value, $x_t(n)$, is $$x_n(t) = x_n(t-1)*h_1(t) + h_2(t) \quad (5)$$

There is a linear model defined for each antenna element. This is a 1st order model. Higher order models are possible by changing H and h to include more terms.

A separate KF state estimation filter is created for each antenna element. This KF is a standard KF defined in Kay, S. M., Statistical Signal Processing: Estimation Theory, 1993 (https://ieeexplore.ieee.org/document/8770245) that updates a linear model of a value based on periodic measures, specifically the steps are as follows: The previous beam weights are used to construct the data for the linear model (H), but now noted as $$v = [x(k-1,n) 1] \quad (6)$$

The new linear model coefficients are predicted.

$$hp(k) = A*h(k-1,n) \quad (7)$$

$$Pp = A*P(k-1,n)*A^T + Q \quad (8)$$

The Kalman gain is calculated:

$$K(k, n) = \frac{Pp*v'}{R + v*Pp*v'} \quad (9)$$

The new linear model coefficients are updated with the measurement error and Kalman gain.

$$h(k, n) = hp(k) + K(k,n)*[m(k,n) - v*hp(k,n)] \quad (10)$$

The new beam weights are calculated.

$$x(k,n) = v*h(k,n) \quad (11)$$

$$P(k,n) = I - K(k,n)*v*Pp \quad (12)$$

The measurement, m, is made by estimating the beam weights with a reduced set of sample data. In one case, a LS estimator using the first 10% of the signal samples is sufficient. A LS estimator is used by solving the expression below for $w_{est}$, $$d = s*w_{est}, \quad (13)$$

where d and s are column vectors (dimension t rows and N columns) of a reduced length than the full reference signal (e.g. the first 10% of samples) of the desired signal and the received signal at each element, respectively. Using a LS estimator, the expression for $w_{est}$ becomes $$w_{est}(t) = (s'*s)^{-1}s'*d \quad (14)$$

where $w_{est}(t)$ is a 1 by N row matrix containing an estimate of the complex beam weights at the time t (other estimators are possible).

The measurement for the KF depends on whether the KF is tracking the magnitude or unwrapped phase; separate KF are used for each. Alternatively, the magnitude of the measurement estimate may be sufficient. For the magnitude KF, the measurement, m, is $$m_{mag} = |w_{est}(t)| \quad (15)$$

For the phase KF, the measurement, m, is $$m_{phase} = \text{unwrap}(\angle w_{est}) \quad (16)$$

Notice the phase measurement is the unwrapped phase value over a period of time that corresponds to the start of the linear model. The phase wraps do not matter when applying the beam weights to the signal to isolate the desired signal, but it is important for the linear model estimated by the KF to estimate the next phase value.

The terms A, P, Q, and R are tuning parameters for the Kalman filter. They can be adjusted individually to lower the MSE. A is a state transition matrix that affects the speed at which the KF adapts; lower values seem to lengthen the time it takes for the KF to reduce the MSE. P is the error covariance matrix for which its initial value can affect the MSE early, but usually converges to a value over time. Q is the covariance of the noise in the error covariance. R is the covariance of measurement error. A, P, and Q describe the linear model coefficients and are 2×2 matrices, while R describes the beam weight being estimated and is a singular value (1×1 matrix).

A gNB can use the KF to estimate the beam weights through the following KF algorithm of this invention. A time step is the time interval between reference signal transmissions. An assumption is made that the beam pattern needs a reference signal and the reference signal is able to update a beam pattern when the reference signal is available.

1. The gNB estimates the optimal beam pattern weights using an adaptive beamforming algorithm for at least α time steps, where a is the linear model order number +2 (i.e. a $1^{st}$ order polynomial requires α=3 time steps.)
2. For either a magnitude or phase KF, a linear model is created from the adaptive beamforming algorithm estimates by applying equations to estimate the next beam weight value using equation (4).
3. For each time step:
    a) an estimate of the beam pattern weights is made using equations (13) and (14); and
    b) a magnitude KF will use equation (15) to calculate the measurement for this time step and a phase KF will use equation (16) to calculate the measurement for this time step.
4. For each antenna element, time step, and magnitude KF or phase KF:
    a) a linear estimator matrix is formed from the previous data (according to the model order) as equation (6)
    b) a prediction is made of the state of the beam weight linear model coefficients using equation (7)
    c) error covariance is calculated using equation (8)
    d) Kalman gain is calculated using equation (9)
    e) an estimate of the beam weight linear model coefficients is made using equation (10)
    f) a new beam weight is calculated using the new estimate for the linear model coefficients using equation (11); and
    g) an error covariance is computed using equation (12).

Additional variations of this algorithm can incorporate other beam pattern adjustments, for example, steering nulls, in between steps 3 and 4. This algorithm can be executed for each UE within the MU-MIMO application.

The KF algorithm of this invention provides a significant computation cost savings when compared to a LS estimate. The LS estimate requires a matrix inversion, a $O(N^3)$ operation. The KF and LS estimates of this KF algorithm, as presented above, require much smaller matrix inversions, compared to the LS estimate. The measurement estimate LS inversion in the KF algorithm is 10% of the signal samples (1% of the matrix size) and therefore requires 0.001 (0.1%) of the computing operations, compared to the LS estimate. The KF matrices are sized by the linear model polynomial order. In one case this is a 1$^{st}$ order polynomial, which means the KF, per antenna element, is inverting 2×2 matrices.

There are other adaptive processing algorithms that have different levels of complexity that can be used in the KF algorithm of this invention. Always, when the size of the data is reduced, there is a reduction in the computation that also reduces the complexity of the measurement step in the KF algorithm approach presented herein.

Simulation Example

The goal of the KF algorithm will be to estimate the beam weights to recover the desired signal using less data, and less computation than using an adaptive beam weight algorithm by itself. The simulation uses a least-squares (LS) batch method to estimate the true and measured optimal beam weights for simplicity. RLS algorithms iteratively update their response with each new sample. The use of RLS algorithms isn't required in the simulation case and doesn't fundamentally change the LS calculation but is just an alternant method for implementation.

Reference Signal Duration A slot duration is 0.5 ms and contains 6 or 7 OFDM symbols, depending on carrier implementation choice. Assuming 7 symbols are used for the shortest reference signal duration, ignoring cyclic prefix duration for simplicity, results in a symbol duration of 71.43 microseconds. Given the signal bandwidth is 30.72 MHz, roughly 2048 bits are needed to encode a reference signal. The simulation will use a BPSK modulated signal with randomly generated bit sequence as a stand-in for the length 31 Gold sequence (Evolved Universal Terrestrial Radio Access (E-UTRA); Physical channels and modulation, V16.7.0, 3GPP Standard TS 36.211, 2021, pages 15-24, 55-81, 147-180).

MIMO Channel The beam pattern in a MU-MIMO application is stochastic because the multipath opportunities vary in the number and length of each path as the UE or objects in the environment change position relative to each other. Several model standards exist for GSM/EDGE, CMDA, and ITU-R HF as Rayleigh or Rician fading channels. A Rayleigh channel will have roughly equal multipath components, while the Rician fading channel will have one or a few dominate paths of many other pathways to/from Tx/Rx. To the degree that either Rayleigh or Rician is preferred depends on data.

A MATLAB MIMO Channel model is used to define a standard channel type (MATLAB Documentation, "stdchan," R2021a https://www.mathworks.com/help/releases/R2021a/comm/ref/stdchan.html?searchHighlight=stdchan&s_tid=doc_srchtitle) (e.g. GSM/EDGE urban, 6 taps, case 1) and returns both the signal after passing through the channel and the complex path gains for each antenna port. This model delays the signal 6 unique time delays and applies a gain value to each delay path. A Rayleigh scattering case is chosen such that there is no dominate direction to steer the antenna. An example of the optimal beam pattern weights necessary to recover the signal at 0.5 ms intervals is shown below in FIG. 1 and FIG. 2. Eight antenna elements were modeled at the gNB to receive/transmit a signal from/to a UE. (As antenna patterns are reciprocal, transmit and receive use the same pattern.)

Figure 1:
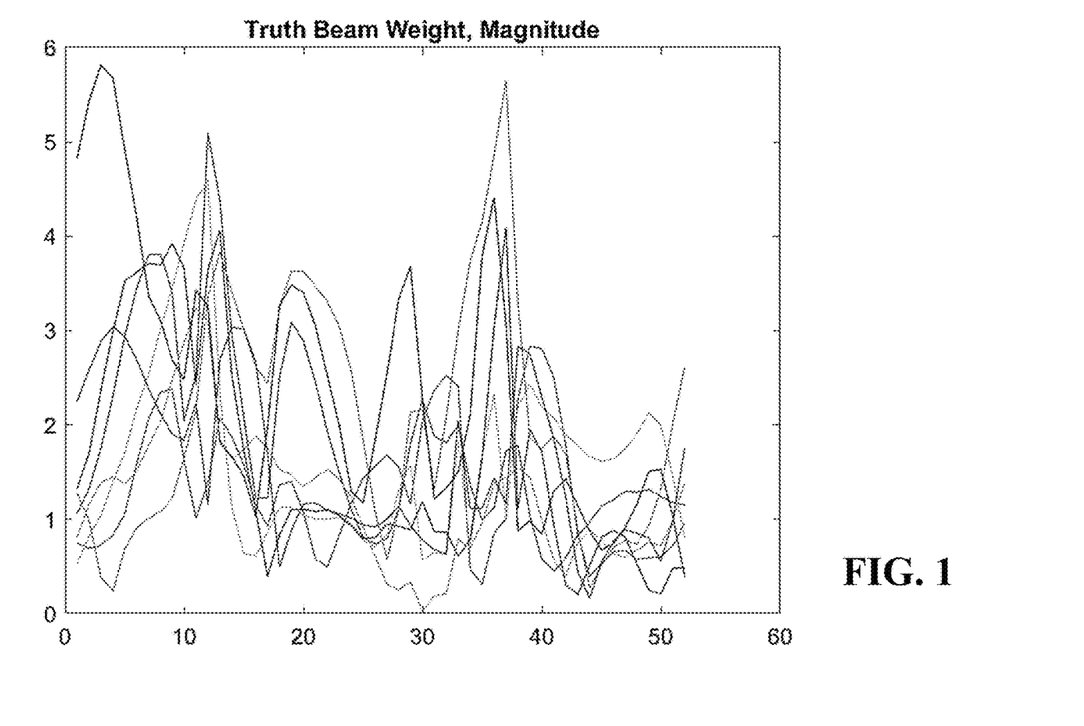
FIG. 1 shows a magnitude of the beam pattern weight necessary to recover the desired signal through a MATLAB MIMO Channel model.
Figure 2:
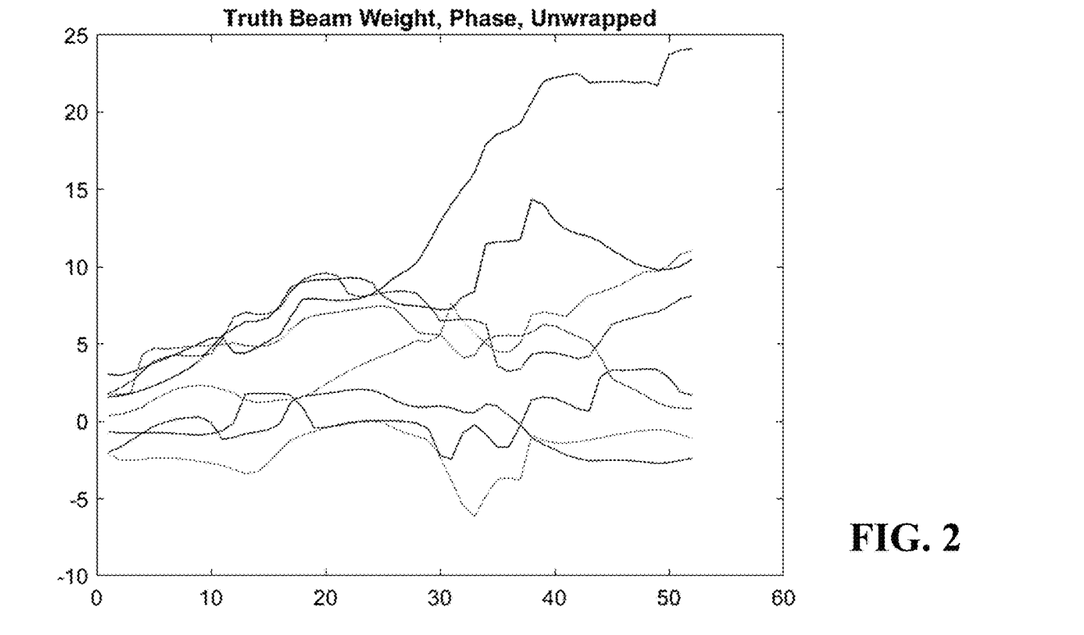
FIG. 2 shows an unwrapped phase of the beam pattern weight necessary to recover the desired signal through a MATLAB MIMO Channel model.

FIG. 1 shows a magnitude of the beam pattern weight necessary to recover the desired signal through a MATLAB MIMO Channel model with standard channel GSM/EDGE urban, 6 taps, case 1. FIG. 2 shows an unwrapped phase of the beam pattern weight necessary to recover the desired signal through a MATLAB MIMO Channel model with standard channel GSM/EDGE urban, 6 taps, case 1.

Results

Figure 3:
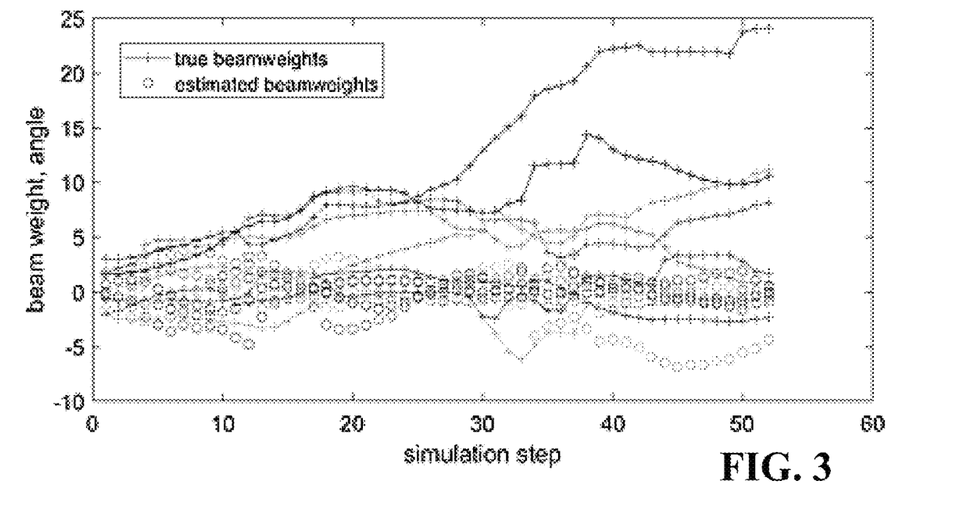
FIG. 3 shows a comparison of an estimated unwrapped phase of the beam weights using 10% of the reference signal length/samples with the true unwrapped phase of the beam weights.

FIG. 3 shows a comparison between an estimated unwrapped phase of the beam weights using 10% of the reference signal length/samples and the true unwrapped phase of the beam weights (FIG. 2). Each line is a different antenna element.

Figure 4:
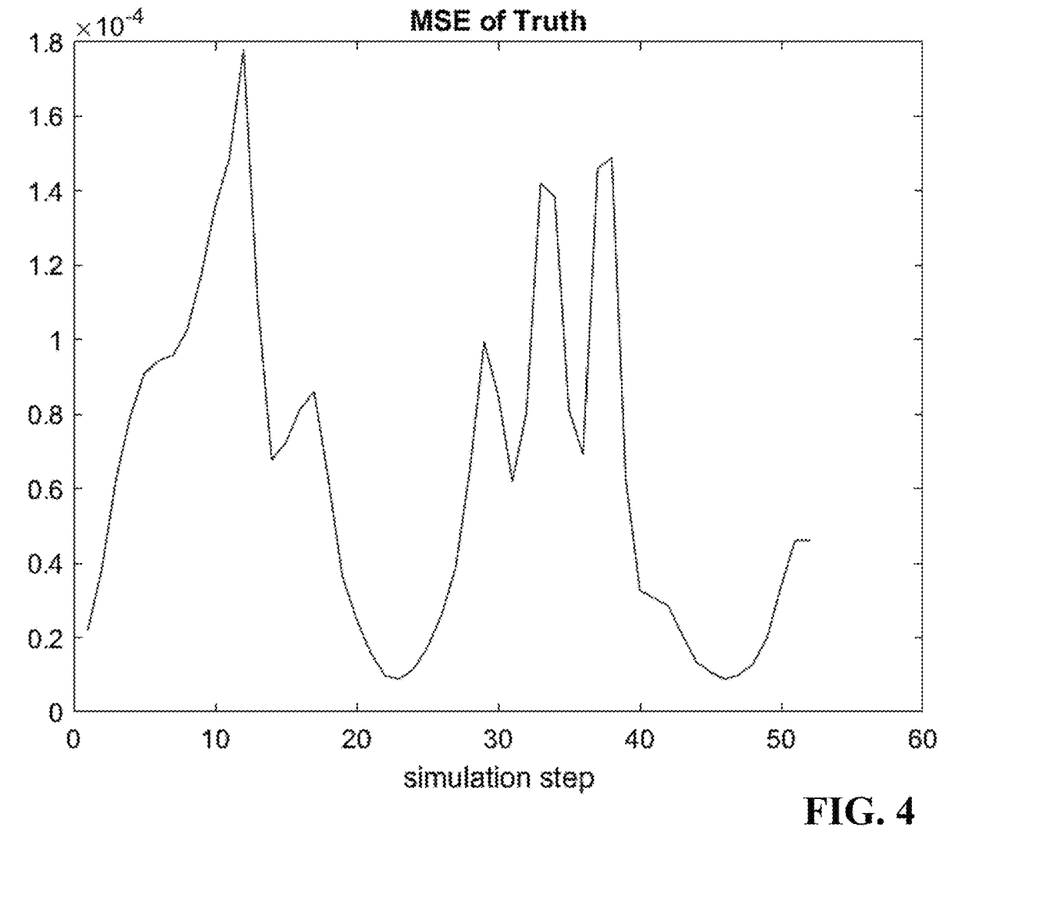
FIG. 4 shows the mean square error (MSE) of the LS estimated beam weights using the full period of data applied to received signal through the MIMO channel and the desired signal at each stimulation step.

The true beam weights are calculated using the LS estimator with the entire length of the reference signal. The mean square error (MSE) of the LS estimated beam weights applied to received signal through the MIMO channel and the desired signal at each stimulation step are shown in FIG. 4.

Figure 5:
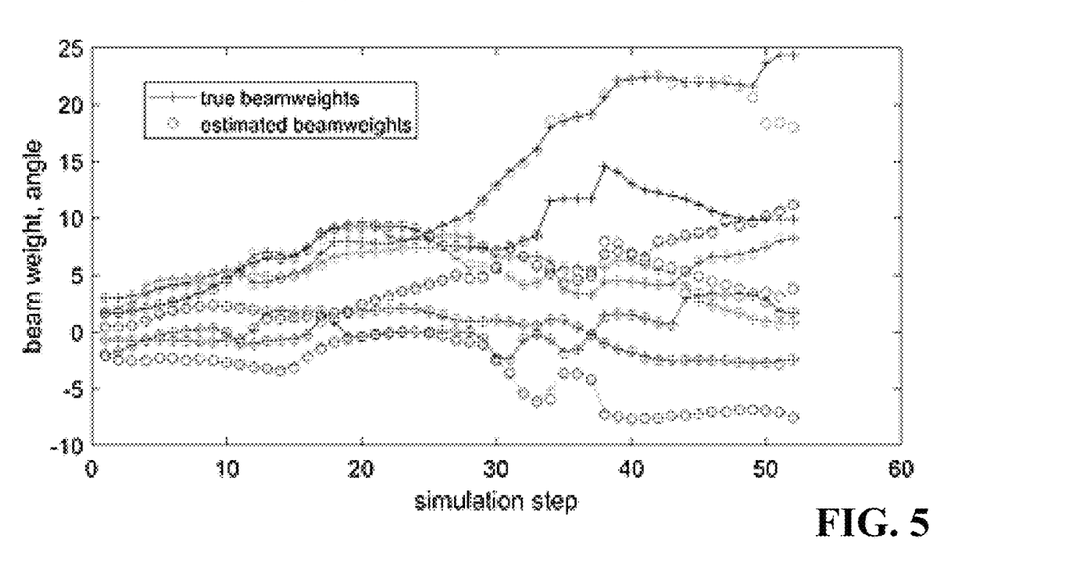
FIG. 5 shows a comparison of using the KF algorithm to estimate the unwrapped phase of the beam weights with the true unwrapped phase of the beam weights.

FIG. 5 shows the results of using the KF algorithm to estimate the unwrapped phase of the beam weights. Each line is a different antenna element. Visually, the estimated beam weights align well with the true beam weights. There is a simulation time step for two of the antenna elements where the phase unwraps do not perfectly align.

Figure 6:
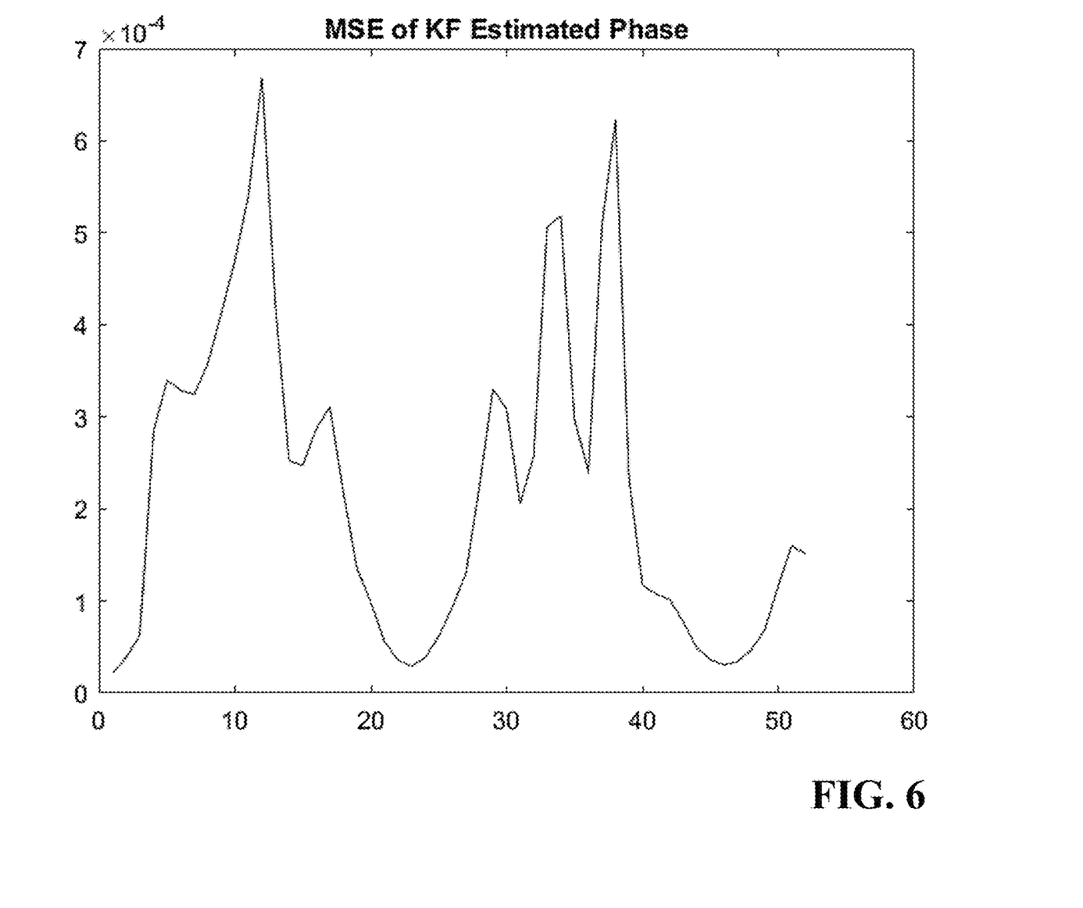
FIG. 6 shows mean squared error of the KF algorithm estimated beam weights applied to received signal through the MIMO channel and the desired signal at each simulation step.
Figure 7:
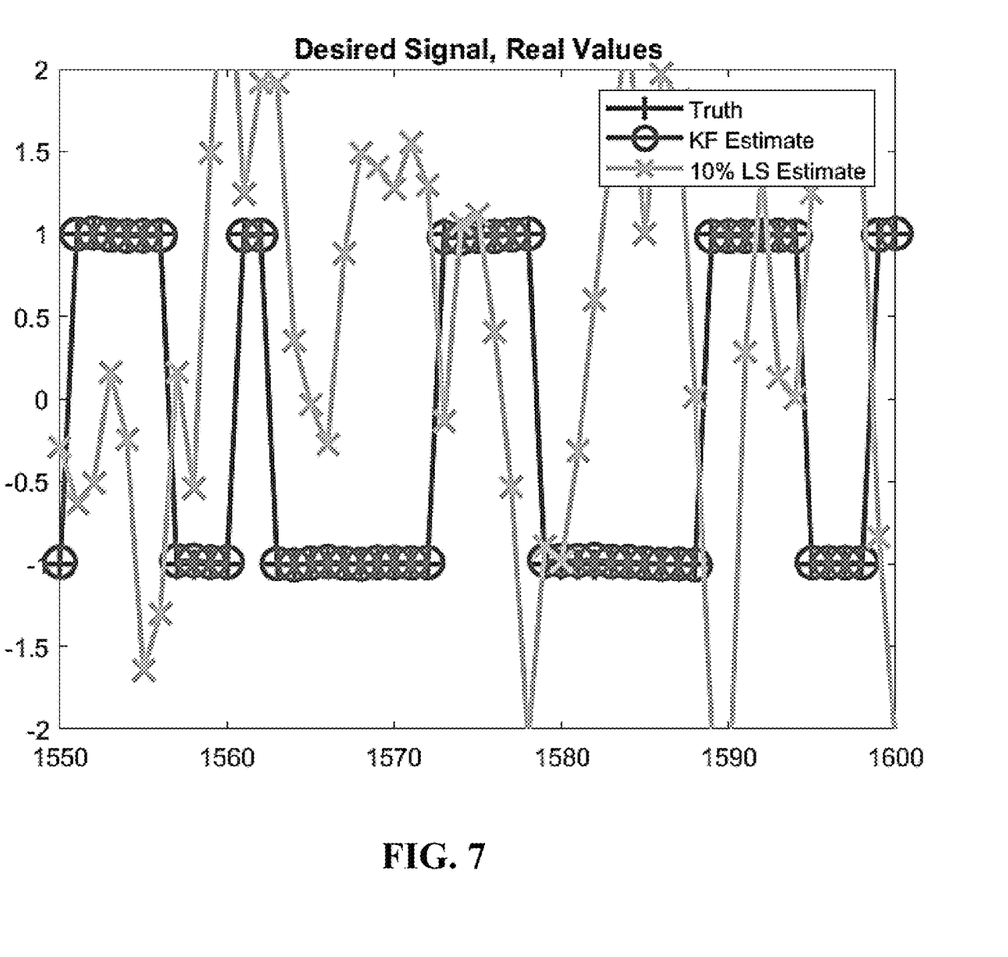
FIG. 7 shows a plot of the real component of the desired signal (Truth), the KF estimate of the beam weights applied to the received signal through a MIMO Channel, and a LS estimate of beam weights using 10% of the received signal through a MIMO Channel.

FIG. 6 shows the mean squared error of the KF algorithm estimated beam weights applied to received signal through the MIMO channel and the desired signal at each simulation step. The MSE plot shows a 4×increase from the truth (in FIG. 4) with a similar characteristic over each simulation step. FIG. 7 shows a plot of the real component of the desired signal (Truth), the KF estimate of the beam weights applied to the received signal through a MIMO Channel, and a LS estimate of beam weights using 10% received signal length through a MIMO Channel. FIG. In FIG. 7 the real component of the 10% estimate, the KF, and desired signal qualitatively show that the KF estimate properly recovers the desired signal. Other tests not shown indicate use of 5% of samples to create KF measurements seems to be satisfactory while 1% seems to be unsatisfactory.

Figure 8:
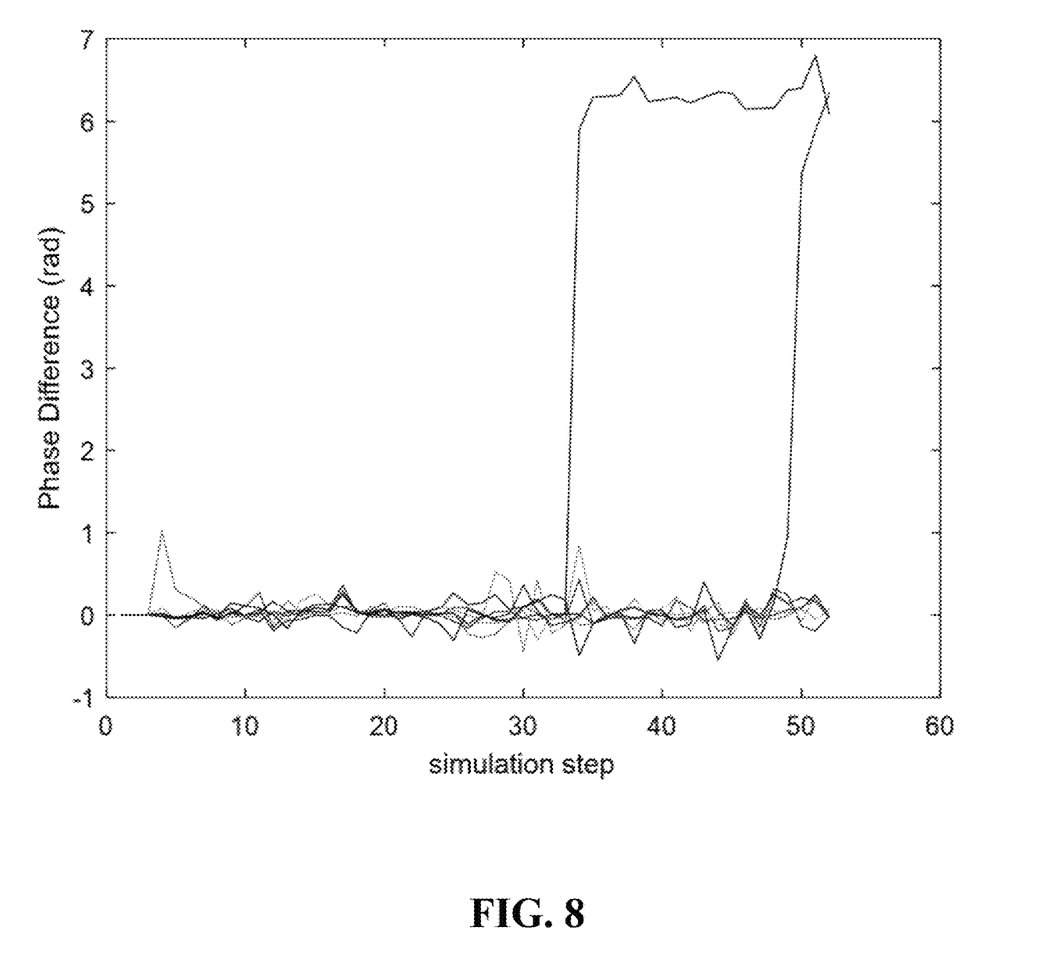
FIG. 8 shows a plot of the difference between the unwrapped angle of the true beam weights and the KF estimate for each antenna element.

FIG. 8 shows a plot of the difference between the unwrapped angle of the true beam weights and the KF estimate for each antenna element. Notice the error nearly jumps by $2\pi$ radians indicating that the estimated values are not quite hitting the same phase unwrap thresholds. This result does not seem to affect the MSE results. Both of these factors indicate the unwrapped phase mismatch in FIG. 5 is due to $2\pi$ phase wraps and do not affect performance of the algorithm.

Figure 9:
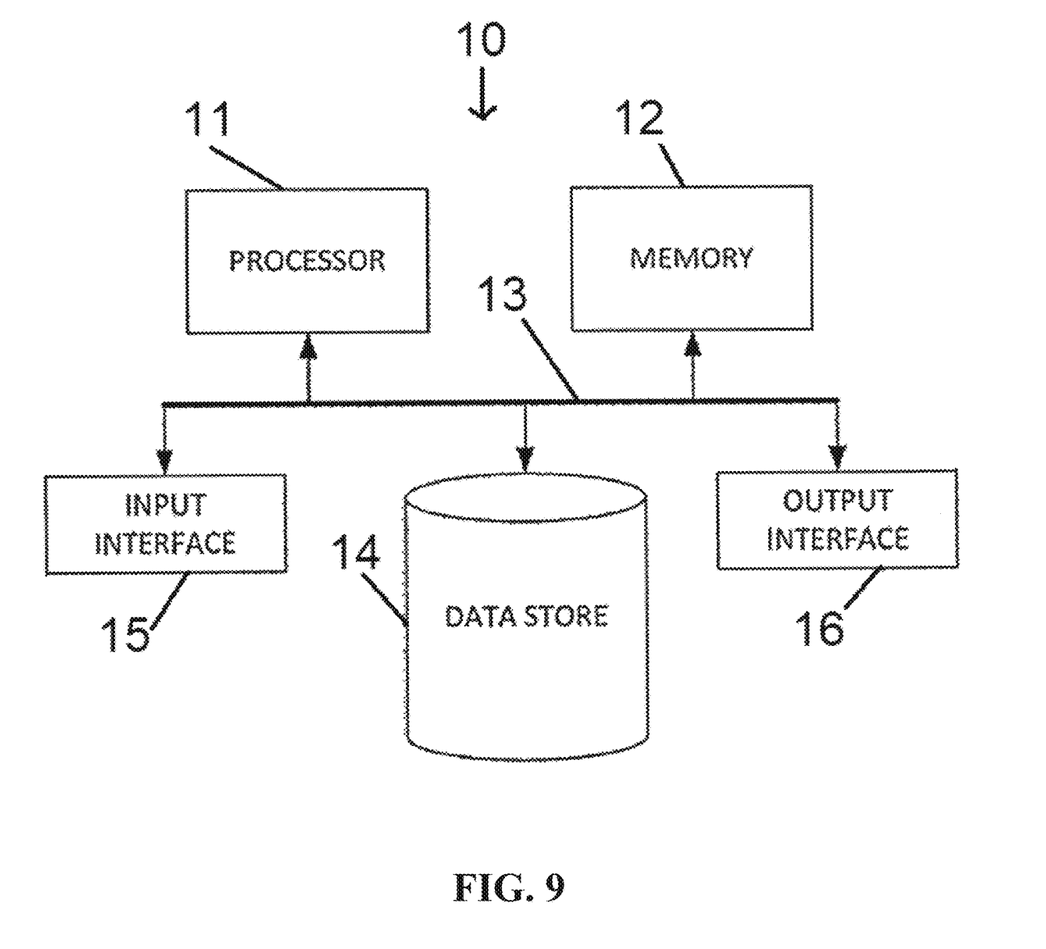
FIG. 9 illustrates an exemplary computing system that can be used in accordance with the systems and methodologies disclosed.

FIG. 9 illustrates an exemplary computing system 10 that can be used in accordance with the systems and methodologies disclosed. For example, the computing device 10 can be used to perform all the calculations required to implement the algorithms disclosed herein and to perform the steps of the method and system of the present invention. The computing device 10 includes at least one processor 11 that executes instructions that are stored in a memory 12. The instructions may be, for instance, instructions for implementing functionality described as being carried out by one or more components discussed above or instructions for implementing one or more of the methods described above. The processor 11 may access the memory 12 by way of a system bus 13. In addition to storing executable instructions, the memory 12 may also store operating parameters, required algorithm software, and so forth.

The computing device 10 additionally includes a data store 14 that is accessible by the processor 11 by way of the system bus 13. The data store 14 may include executable instructions, operating parameters, required operating parameters, etc. The computing device 10 also includes an input interface 15 that allows external devices to communicate with the computing device 10. For instance, the input interface 15 may be used to receive instructions from an external computer device, from a user, etc. The computing device 10 also includes an output interface 16 that interfaces the computing device 10 with one or more external devices. For example, the computing device 10 may display text, images, etc., by way of the output interface 16.

Additionally, while illustrated as a single system, it is to be understood that the computing device 10 may be a distributed system. Thus, for example, several devices may be in communication by way of a network connection and may collectively perform tasks described as being performed by the computing device 10.

The foregoing description illustrates and describes the disclosure. Additionally, the disclosure shows and describes only the preferred embodiments but, it is to be understood that the preferred embodiments are capable of being formed in various other combinations, modifications, and environments and are capable of changes or modifications within the scope of the invention concepts as expressed herein, commensurate with the above teachings and/or the skill or knowledge of the relevant art. The embodiments described herein above are further intended to explain the best modes known by applicant and to enable others skilled in the art to utilize the disclosure in such, or other, embodiments and with the various modifications required by the particular applications or uses thereof. Accordingly, the description is not intended to limit the invention to the form disclosed herein. Also, it is intended that the appended claims be construed to include alternative embodiments. It will be further understood that various changes in the details, materials, and arrangements of the parts which have been described and illustrated above in order to explain the nature of this invention may be made by those skilled in the art without departing from the principle and scope of the invention as recited in the following claims.

We claim:

1. A computer implemented method for reducing adaptive beamforming computation resources for estimating and updating a model of beam weights, comprising:
    a) estimating, through a computer device by a base station, optimal beam pattern weights of an antenna electromagnetic element signal duration, using an adaptive beamforming algorithm for at least 3 time steps of the antenna electromagnetic element signal, wherein a time step is a time interval between reference signal transmissions;
    b) creating, through the computer, an initial linear model for either magnitude or phase components of the optimal beam pattern weights computed from the adaptive beamforming algorithm estimates;
    c) estimating, through the computer, for each time step, a measurement of the optimal beam pattern weights, using a reduced set of data comprising 5-20% of first samples of data generated by the antenna electromagnetic element signal duration; and
    d) computing new beam pattern weights, through the computer, using a magnitude state estimation filter and/or phase state estimation filter, wherein the computation resources required by the adaptive beamforming algorithm to obtain the new beam pattern weights are reduced by 80 to 90%.

2. The computer implemented method of claim 1, further comprising, for each antenna electromagnetic element signal duration, time step, and magnitude or phase state estimation filter;
    a) forming an estimator matrix;
    b) predicting the state of beam weight model coefficients;
    c) calculating error covariance;
    d) calculating state estimation filter gain;
    e) estimating beam weight model coefficients;
    f) calculating a new beam pattern weight using the estimate for the beam weight model coefficients; and
    g) computing error covariance.

3. A computer implemented method for reducing adaptive beamforming computation resources for estimating and updating a linear model of unwrapped beam weights, comprising:
    a) estimating, through a computer device by a base station, optimal beam pattern weights of an antenna element signal, using an adaptive beamforming algorithm for at least 3 time steps of the antenna electromagnetic element signal, wherein a time step is a time interval between reference signal transmissions;
    b) creating, through the computer, an initial linear model for either magnitude or phase components of the optimal beam pattern weights computed from the adaptive beamforming algorithm estimates;
    c) estimating, through the computer, for each time step, a measurement of the optimal beam pattern weights, using a reduced set of data comprising 5-20% of first samples of data generated by the adaptive beamforming algorithm; and
    d) computing Kalman factor state filter measurements, through the computer, wherein the computation resources required by the adaptive beamforming algorithm to obtain a new beam pattern weights are reduced by 80 to 90%.

4. The computer implemented method of claim 3, further comprising, for each antenna element signal and each time step;
    a) forming a linear estimator matrix;
    b) predicting the state of beam weight linear model coefficients;
    c) calculating error covariance;
    d) calculating Kalman gain;
    e) estimating beam weight linear model coefficients;
    f) calculating a new beam pattern weight using the estimate for the beam weight linear model coefficients; and
    g) computing error covariance.

5. The computer implemented method of claim 3, wherein step b) employs the $$h = (H'*H)^{-1}H'*Z = \begin{bmatrix} h_1(t) \\ h_2(t) \end{bmatrix};$$

following equation:

Step c) employs the following equations: $d = s*w_{est}$ and $w_{est}(t) = (s'*s)^{-1}s'*d$; and Step d) employs the following equation $m_{mag} = |w_{est}(t)|$ for the magnitude KF and the following equation $m_{phase} = \text{unwrap}(\angle w_{est})$ for the phase KF.

6. The computer implemented method of claim 4, wherein step a) uses the following equation: $v = [x(k-1, n)1]$;
step b) uses the following equation: $hp(k) = A*h(k-1,n)$;
step c) uses the following equation: $Pp = A*P(k-1,n)*A^T + Q$;
step d) uses the following equation:

$$K(k, n) = \frac{Pp*v'}{R + v*Pp*v'};$$

step e) uses the following equation: h(k,n)=hp(k)+K(k,n)*[m(k,n)−v*hp(k,n)];

step f) uses the following equation: x(k,n)=v*h(k,n); and step g) uses the following equation: P(k,n)=I−K(k,n)*v*Pp.

7. A computer implemented method for reducing adaptive beamforming computation resources for estimating and updating a linear model of unwrapped beamforming weights, comprising:

a) estimating, through a computer device by a base station, the optimal beam pattern weights of an antenna element signal, using an adaptive beamforming algorithm for at least 3 time steps of the antenna electromagnetic element signal, wherein a time step is a time interval between reference signal transmissions;

b) creating, through the computer, an initial linear model for either magnitude or phase components of the optimal beam pattern weights computed from the adaptive beamforming algorithm estimates, using the following equation:

$$h = (H'*H)^{-1}H'*Z = \begin{bmatrix} h_1(t) \\ h_2(t) \end{bmatrix};$$

c) estimating, through the computer, for each time step, a measurement of the optimal beam pattern weights, using a reduced set of data comprising 5-20% of first samples of data generated by the adaptive beamforming algorithm, using the following equations:

$d=s*w_{est}$ and $W_{est}(t)=(s'*s)^{-1}s'*d$;

d) computing Kalman factor state filter measurements, through the computer, using the following equation for the magnitude KF:

$m_{mag}=|w_{est}(t)|$ and the following equation for the phase KF:

$m_{phase}=\text{unwrap}(w_{est})$; and e) for each antenna element signal and each time step;
  i) forming a linear estimator matrix;
  ii) predicting the state of the beam pattern weight linear model coefficients;
  iii) calculating error covariance;
  iv) calculating Kalman gain;
  v) estimating beam pattern weight linear model coefficients;
  vi) calculating a new beam pattern weight using the estimate for the beam pattern weight linear model coefficients; and
  vii) computing error covariance, wherein the computation resources required by the adaptive beamforming algorithm to obtain new beam pattern weights are reduced by 80 to 90%.

8. The computer implemented method of claim 7, wherein step i) uses the following equation: v=[x (k−1,n)1];

step ii) uses the following equation: hp(k)=A*h(k−1,n);

step iii) uses the following equation: Pp=A*P(k−1,n)*$A^T$+Q;

step iv) uses the following equation:

$$K(k, n) = \frac{Pp*v'}{R+v*Pp*v'};$$

step v) uses the following equation: h(k,n)=hp(k)+K(k,n)*[m(k,n)−v*hp(k,n)];

step vi) uses the following equation: x(k,n)=v*h(k,n); and step vii) uses the following equation: P(k,n)=I−K(k,n)*v*Pp.

\* \* \* \* \*